Figure 1:
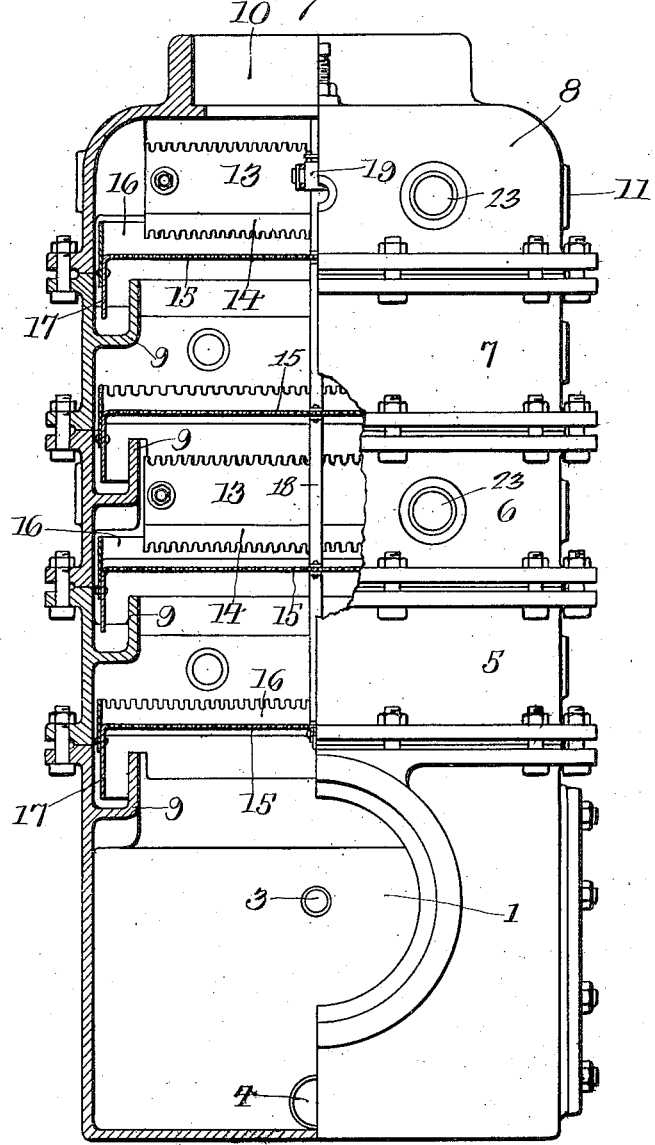

W. G. LAIRD.
SCRUBBER.
APPLICATION FILED SEPT. 6, 1916. RENEWED MAR. 14, 1921.

1,419,867.

Patented June 13, 1922.
2 SHEETS—SHEET 1.

Witness
George G. McDaniel

Inventor
Wilbur G. Laird
By K. P. McElroy
Attorney

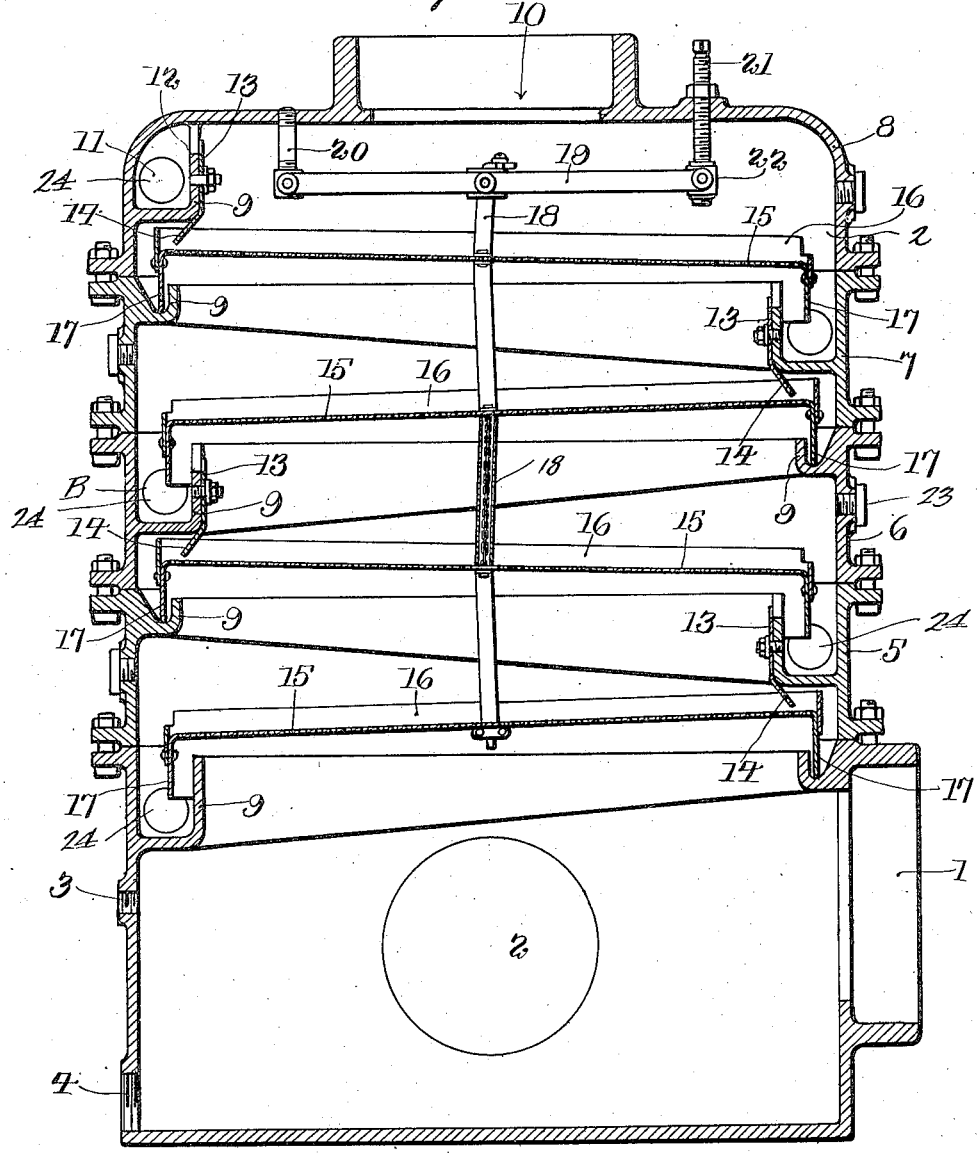

UNITED STATES PATENT OFFICE.

WILBUR G. LAIRD, OF NEW YORK, N. Y., ASSIGNOR TO HENRY L. DOHERTY, OF NEW YORK, N. Y.

SCRUBBER.

1,419,867. Specification of Letters Patent. Patented June 13, 1922.

Application filed September 6, 1916, Serial No. 118,649. Renewed March 14, 1921. Serial No. 452,229.

*To all whom it may concern:*

Be it known that I, WILBUR G. LAIRD, a citizen of the United States, residing at New York, in the county of New York and State of New York, have invented certain new and useful Improvements in Scrubbers, of which the following is a specification.

This invention relates to scrubbers and it comprises an apparatus for producing an intimate contact between gases or vapors and a liquid or liquids; said apparatus comprising a casing, one or more level or inclined perforated diaphragms spanning the interior of said casing; means for adjusting the angle of position of said diaphragm or diaphragms, liquid sealing and over-flow means for said diaphragm or diaphragms, means for introducing a gas or a vapor, or both, at the lower portion and removing it at the upper portion of said casing, and means for introducing liquid for distribution on the said diaphragm or diaphragms; all as more fully hereinafter set forth and as claimed.

In scrubbing gas, air, etc., to remove impurities, for cooling, for saturating with vapors of liquids or other purpose, or in scrubbing a liquid with air or gas for cooling, or for removing any volatile constituents or other purpose, it is desirable that the contact of the gas with the water or other suitable liquid be as intimate as possible, which in practice is best secured by a bubbling contact between the two, and it is also desirable that this shall be accomplished with as little friction or resistance as possible to the passage of the gas so as not to create a high back-pressure, and it is also desirable that the vertical distance through which the liquid must travel within the apparatus be reduced as much as possible, thus avoiding loss of head; for example, in case an apparatus be employed for removing a small amount of ammonia from a large amount of gas, the back pressure created against the passage of the gas may be of considerable importance—then, again, in a case where an apparatus is required to cool a large amount of water, the loss of water head in the apparatus may be of considerable importance. The present invention has for an object, the production of a thorough contact between vapor or gas, or both, and a liquid or liquids, without at the same time interposing great resistance to the passage of the vapor or gas, or necessitating a high head on the liquid or liquids. I have found that this result may be attained with a particular type of liquid covered diaphragm which gives a substantially uniform and thorough contact between liquid and gas whatever its lateral extension. By securing uniform passage of gas through all parts of a layer of liquid on a wide diaphragm, obviously as complete a washing can be obtained as by passing the gas serially through several narrow diaphragms without the greater resistance of the series of layers of liquid on the latter. While I regard the apparatus, and shall hereinafter describe it, as more particularly applicable to purifying, condensing or treating gas for the removal of ammonia, $CO_2$, $H_2S$, naphthalene, $C_6H_6$, etc., yet it is also applicable in a wide variety of other arts where a gas or a vapor or both is to be contacted with a liquid or liquids, as in distillation, conditioning air, cooling water, or other liquids, enriching gases by the use of a volatile enricher, etc.

It is a further object of my invention to provide a simple, rugged type of scrubber, readily constructed, assembled, repaired, enlarged, cleaned, and adjusted.

To these ends I provide a casing of iron, steel, or other suitable metal or material. This casing may be composed of one or more annular sections, such sections, where more than one is employed, being preferably united by flanged joints. At the bottom are an inlet for gas and an outlet for scrubbing liquid which may be water, ammonia solution, oil, or any other liquid. At the top are an outlet for gas and an inlet for scrubbing liquid. On the inner periphery these sections are flanged to provide trough-like elements. Spanning the interior of the casing is a perforated diaphragm with its edges sealed by the liquid in these trough-like elements which together form one continuous trough for each diaphragm. The perforations are small and adapted for passage of gas therethrough without much, if any, passage of liquid. It will be understood that while only one diaphragm need be employed in the present invention, yet in the majority of cases, a plurality of diaphragms will be found advantageous. These diaphragms may be level or set at an angle, and means are provided for varying this angle. Liquid coming from the top is received on the first diaphragm and covers its top in film form. The thickness of this film or layer depends in part upon the angle of the diaphragm and the amount or flow of liquid supplied. I ordinarily provide the diaphragm with a rim or flange around its upper portion, making it, so to speak, pan-like. The upward passing gas goes through the perforations and through and past the liquid film, producing the appearance of a boiling action and great thoroughness of contact between the liquid and the gas. With perforations of the type ordinarily employed, say ⅛" diameter and with the ordinary thickness of liquid layer on the plate, no substantial amount of the liquid goes through these perforations but any drip there may be falls to the diaphragm next below. In cases where a continuous flow of liquid is required to pass through the apparatus, practically all the liquid on the plate flows to the liquid seal at the discharge end of the diaphragm and thence down to the next diaphragm below. Where it is not required that the liquid pass in a continuous current through the apparatus, as in cases where the liquid is employed merely as an enricher for the gas, the diaphragm may be set substantially level, and only such liquid as boils over the pan-like edges of the diaphragm or passes through the perforations finds its way to the bottom of the apparatus; the feed of liquid in such event being merely enough to supply the loss caused by evaporation.

Where the plates are fixed, level or at any predetermined angle, instead of being movable as they may be, a liquid seal is necessary only at the end where the liquid discharges from the diaphragm, and, in the event of the liquid not being required to pass through the apparatus, as in the case of enriching as mentioned above, no liquid seal whatever is required, the diaphragms being fixed direct to the interior walls of the section.

In the accompanying illustration, I have shown the apparatus of the present invention more or less diagrammatically. In this showing, Figure 1 is a view partly in elevation and partly in vertical section of a complete apparatus under this invention, composed of a plurality of adjustable diaphragms; the half view to the right being in elevation, and, Figure 2 is a view in central vertical section in a direction at right angles to the view in Figure 1.

In this apparatus, the scrubber or gas-and-liquid contacting device is made up of a number of superimposed sections united by flanged joints in a usual way. The bottommost section is provided with an inlet 1 for gas, man-hole 2, inlet 3 for introducing steam, vapors or gases or clean-out water, and outlet 4 for liquids. Mounted above these are several intermediate similar sections (three are shown) 5, 6 and 7, and above these again is top section 8. Each of these sections is provided with a trough-like flange 9 at each end of the diaphragm, the trough being shallower and narrower at one end than at the other end and the troughs being connected to each other by troughs on each side, the several troughs thus in effect, forming one continuous trough around the inner periphery of the section. The form of trough differs somewhat in section, this difference depending on its relations to the diaphragms which it engages. The casing may be round or square or any other desired shape or size; the preferred form is rectangular. The shape and size of the casing and the number of diaphragms to be used depend upon circumstances; upon the gas or vapor to be treated, and the amount of washing to which the gas or vapor is to be exposed as well as the amount of washing liquid to be used, its absorptive power, etc. Circumstances also govern the size and the pitch of the holes provided for the passage of the gas.

It is found in practice that the passage of gas through uniform perforations in such a diaphragm is substantially equal at all points, that is, there is substantially the same amount of gas passing through each perforation. There is not a greater tendency for the passage of gas at one point than at another when a liquid film of equal thickness covers the diaphragm. Such being the case, obviously any desired number of square feet of area of diaphragm (or which is the same thing, area of liquid on the diaphragm) may be secured with a diaphragm of any shape, but with a given flow of liquid, different dimensions of diaphragms and different numbers of diaphragms with different size and numbers of holes, give a difference in the length of time to which the given amount of liquid is exposed to the gas; give a difference in the time contact factor as does the method of distribution of liquid on the diaphragms. For the same quantity of liquid flowing down a long path has obviously a longer period of contact with the gas than when flowing in a broader and shorter path; the velocity of flow being in each case the same. If the liquid be fed at a plurality of points along the path of travel of the liquid on the diaphragm, obviously the time contact factor is again diminished. Therefore, in each case, it is necessary to shape and dimension the diaphragms in accordance with the duty to be performed by the liquid in the event that adjustment of the angle of the diaphragm with consequent change in the speed of flow of liquid is insufficient. It is also necessary to perforate the diaphragm with a suitable number and size of holes.

The top section or covering dome is further provided with outlets 10 for gas and inlets 11 for liquid which enters a special distributing device 12.

As shown, this distributing device forms a trough to which is bolted a sheet of metal or other suitable material 13, serrated at the top. Liquid coming in through 11 overflows the top of this sheet in a uniform manner because of the serration, flows down it and is directed to the proper point on the diaphragm by a downward continuation 14. Mounted in the various sections are a number of contacting devices or diaphragms 15, each of which is formed of a substantially horizontal perforated plate; there being numerous small perforations in each plate of such a size as to allow the passage of gas therethrough without much downward passage of liquid and each plate being sufficiently inclined to the horizontal to cause liquid flow thereover at a desired rate of speed. Each of these plates has an upward projecting rim 16 converting it into a sort of pan. The lower or discharge end of the pan may have a lower and serrated projecting rim or no rim at all, but preferably has a slight projecting rim serrated to retain the desired liquid film when the plate is maintained in a level position. The lower portion of the plate is provided with another projecting rim or downward continuation 17. This downward continuation at one end enters and seats on the bottom of the described trough member 9, while at the other end it depends into the deeper portion of the trough but does not go to bottom thereof. The downward continuations at the sides enter their corresponding trough sections and engage the bottom thereof only when the plate is at its greatest inclination. Each of the deep end troughs is provided with a liquid directing plate like that used in controlling the inflow of the liquid into the top section (plate 13—14). Each of the perforated plates, as shown, is connected with an angle changing device consisting of a linked vertical bar 18, pivoted on horizontal bar 19. This horizontal bar in turn is pivotally connected with adjustable bar 21 at 22. In the apparatus shown, 18 may be a piece of pipe acting as a spreader between plate 15 and the pivotal connection to 19; each of the spreader members between the plates may likewise be a pipe section of proper length. Through all these pipe sections may pass a flexible steel cord, fastened at the bottom of the lower perforated plate member and at the top to the pivotal connection on bar 19. Thus, the flexible steel rope takes the weight of all the perforated plate members, the pipe spreaders acting to keep these plates in proper relation to each other. Thus the angle of flow of the liquid film is always maintained the same on each plate member regardless of what that angle may be.

Windows 23 may be provided for watching the operation. These windows as shown are discs of glass like those used for watch crystals, mounted on threaded hollow members.

Where it is desirable to draw off or introduce liquid at intermediate points as in using two different currents of liquid, this may be done by inlet and outlet connections 24. In such an event, one plate between the point of outlet and the point of inlet does not function and may be omitted or removed.

In the use of the described structure, water or other liquid having scrubbing or other functions, enters at 11 and overflows at 12, then running down 13 and 14, until it is delivered on the top plate or diaphragm 15 at one end. Down this top perforated plate it runs as a thin layer until it overflows at 16. The liquid overflowing from the top perforated plate into the trough in which the downward flange or rim 17 enters, liquid seals such flange and fills the trough until it overflows past plate 13 to the next perforated plate below, and so on down through the apparatus until the liquid accumulating in the base chamber is taken off at 4. It may, of course, be then cooled or otherwise treated if necessary and returned to 11. The liquid may be cooled in the base section. It will be noted that these plates are not parallel but each successive plate is inclined in an opposite direction. This is not essential but acts to decrease the head required for a given number of plates; the rate of flow of the liquid downward over the plates depending upon this inclination. Each plate as already stated rests on the bottom of the trough at one end while depending into the continued (although slightly changed) part of the same trough at the other end. This arrangement allows the inclination of the plates to be changed and means are provided for doing this during operation, thereby permitting adjustment of the apparatus from time to time.

By screwing out rod 21 all the plates are made more nearly horizontal, the various plates swinging on the end which rests on the bottom of the described trough. By turning 21 in the reverse direction, the angle of inclination of the various plates may be increased and in the same measure. Gas or vapor is introduced at 1 and passes successively up through each of the perforated plates (four are shown) until it escapes at 10.

The flow of the gas through the perforations in the plate prevents practically entirely the downward passage of liquid therethrough and since each plate bears a running film or layer of liquid, the gas bubbles through this film.

In a case where the vapors from the liquid only are to be used as in the case of enriching gas by passing gas through a volatile liquid hydrocarbon, the perforated plate may be fixed and level without liquid seal or flowing liquid; fresh liquid only being supplied to make up for evaporation.

What I claim is:—

1. In a device for contacting gases with liquids, a casing having means for introducing gas at the bottom and withdrawing it at the top, trough shaped elements around the inner walls of said casing, a plurality of plates inclined to the horizontal and spanning said casing and seating at one end on the bottom of the troughs, means operable from the outside of said casing for moving one end of the plates up and down and means for flowing liquid over such inclined partitions successively.

2. In a device for contacting gases with liquids, a casing having means for introducing gas at the bottom and withdrawing it at the top, trough shaped elements deeper at one side than the other around the inner walls of said casing, a plurality of substantially horizontal perforated plates supported within the casing, each provided with an upwardly extending rim and a downwardly extending rim, said downwardly extending rim extending into a trough shaped element and seating on the bottom thereof at its shallower portion, and means for flowing liquid over such partitions successively.

3. In a device for contacting gases with liquids, a casing having means for introducing gas at the bottom and withdrawing it at the top, trough shaped elements around the inner walls of said casing, a plurality of nearly horizontal inclined plates supported within the casing and each provided with an upwardly extending rim and a downwardly extending rim, the downwardly extending rim of each plate extending into one of said trough shaped elements and seating on the bottom thereof at one end, said upwardly extending rim of each plate being serrated at the lower end of the plate, and means for flowing liquid over such inclined partitions successively.

4. In a device for contacting gases with liquids, a casing having means for introducing gas at the bottom and withdrawing it at the top, trough shaped elements deeper at one side than the other around the inner walls of said casing, a plurality of nearly horizontal inclined perforated plates supported in the casing and each provided with an upwardly extending rim and a downwardly extending rim, said downwardly extending rim extending into a trough shaped element and seating on the bottom thereof at its shallower portion, said upwardly extending rim being serrated at the lower end of the plate and means for flowing liquid over such inclined partitions successively.

5. In a device for contacting gases with liquids, a casing having means for introducing gas at the bottom and withdrawing it at the top, trough shaped elements deeper at one side than the other around the inner walls of said casing, a plurality of perforated plates inclined to the horizontal and each provided with an upwardly extending rim and a downwardly extending rim, said downwardly extending rim extending into a trough shaped element and seating on the bottom thereof at its shallower portion, a vertical member connected to all said plates, longitudinally movable means extending outside the casing and connected to said member and means for flowing liquid over such inclined partitions successively.

6. In a device for contacting gases with liquids, a casing having means for introducing gas at the bottom and withdrawing it at the top, trough shaped elements deeper at one side than the other around the inner walls of said casing, a plurality of perforated plates supported in the casing and inclined to the horizontal and each provided with an upwardly extending rim and a downwardly extending rim, said downwardly extending rim extending into a trough shaped element and seating on the bottom thereof at its shallower portion, a vertical member connected to all said plates, a horizontal bar pivotally connected to the upper end of said rod-like member, a screw-threaded raising and lowering device extending through the top of the casing and connected to the end of said horizontal bar, and means for flowing liquid over such inclined partitions successively.

7. In a device for contacting gas with liquid, a casing having means for introducing gas at the bottom and withdrawing it at the top; a plurality of perforated partitions supported on and spanning said casing, the perforations in said partitions having an area which will prevent a liquid from passing downwardly therethrough while gas is passing upwardly therethrough; means for adjusting the inclination of said partitions; means for preventing the passage of gas between the edges of said partitions and the walls of said casing; and means for leading liquid downwardly from one partition and distributing it along one edge of the next lower partition.

8. In a device for contacting gases with liquids; a casing having means for introducing gas at the bottom and withdrawing it at the top; a plurality of inclined movable perforated partitions spanning said casing and engaging its walls, the perforations in said partitions having such a size that they will prevent liquid from passing downwardly therethrough while permitting gas to pass upwardly therethrough; means operable from the outside of the casing to change the angle of the inclination of said partitions; and means for flowing liquid over substantially the entire area of the inclined partitions successively.

9. In a device for contacting gas with liquids; a casing having means for introducing gas at the bottom and withdrawing it at the top; a plurality of perforated substantial horizontal partitions spanning said casing, the perforations in said partitions having such a size that they will prevent liquid from passing downwardly therethrough while permitting gas to pass upwardly therethrough; means for distributing liquid across the entire width of one edge of the upper partition; liquid seals arranged at opposite ends of alternating partitions to uniformly distribute liquids flowing downwardly from one partition to the next, across the entire width of the partitions; and means for preventing the passage of gas between the edges of the partitions and walls of the casing.

In testimony whereof, I affix my signature hereto.

WILBUR G. LAIRD.

Witnesses:
GRAY J. HOUSTON,
R. G. GRISWOLD.